(12) United States Patent
Solie et al.

(10) Patent No.: US 7,880,443 B2
(45) Date of Patent: *Feb. 1, 2011

(54) SYSTEM AND METHOD OF TRICKLE CHARGING A BATTERY IN A NARROW RAIL ARCHITECTURE

(75) Inventors: Eric Magne Solie, Durham, NC (US); Ronil Dipak Patel, Santa Clara, CA (US); Tu A. Bui, Richardson, TX (US)

(73) Assignee: Intersil Americas Inc., Milpitas, CA (US)

( * ) Notice: Subject to any disclaimer, the term of this patent is extended or adjusted under 35 U.S.C. 154(b) by 943 days.

This patent is subject to a terminal disclaimer.

(21) Appl. No.: 11/696,990

(22) Filed: Apr. 5, 2007

(65) Prior Publication Data

US 2008/0088274 A1 Apr. 17, 2008

Related U.S. Application Data

(60) Provisional application No. 60/829,209, filed on Oct. 12, 2006.

(51) Int. Cl.
H02J 7/00 (2006.01)
H02J 7/16 (2006.01)
H02J 7/24 (2006.01)

(52) U.S. Cl. .................. 320/160; 320/162; 320/163; 320/164

(58) Field of Classification Search ............ 320/160, 320/163–164; 323/273, 274
See application file for complete search history.

(56) References Cited

U.S. PATENT DOCUMENTS 5,576,609 A * 11/1996 Brown et al. ............. 320/164
5,659,238 A * 8/1997 Faulk et al. ............. 320/136

* cited by examiner

*Primary Examiner*—Edward Tso
*Assistant Examiner*—Richard V Muralidar
(74) *Attorney, Agent, or Firm*—Howison & Arnott, LLP

(57) ABSTRACT

The charging circuit for charging a battery of an electronic device using a connected AC power adaptor includes circuitry responsive to an applied regulated voltage for charging the battery connected to the charging circuitry. The circuitry prevents the regulated voltage applied to the circuitry from falling below a settable voltage level. Additionally, the circuitry switches a charging current between a quick charge level and a trickle charge level responsive to a state of a transistor.

27 Claims, 4 Drawing Sheets

… (US 7,880,443 B2)

SYSTEM AND METHOD OF TRICKLE CHARGING A BATTERY IN A NARROW RAIL ARCHITECTURE

CROSS-REFERENCE TO RELATED APPLICATIONS

This application claims priority to U.S. Provisional Application 60/829,209, filed Oct. 12, 2006, which is incorporated herein by reference.

TECHNICAL FIELD

The present invention relates to the charging of batteries, and more particularly, to a system and method for trickle charging a battery using a narrow rail architecture.

BACKGROUND

Increasing numbers of portable electronic devices have increased the requirements for various charging schemes for the devices. Most of these devices function in a fashion wherein they may have a first mode of operation wherein the devices are directly connected to an AC/DC power adaptor that is plugged into a wall socket. While connected, the AC/DC adaptor enables the portable electronic device to operate off of the provided AC power and additionally enables charging of a battery within the portable electronic device. Once the battery has been at least partially charged, the electronic device may be powered by the battery. In this way, the device may be unplugged from the AC/DC power adaptor and moved about enabling the user to use the portable electronic device in a number of locations which may or may not have associated power sources.

One method of architecting the power in a portable device is called narrow rail VDC (NVDC). One aspect of NVDC is that the battery is always connected to the system rail voltage unless the battery is fully charged. The system rail is regulated to the battery voltage instead of the adaptor voltage. This architecture has the benefit that the ratio of maximum to minimum system rail voltage is smaller than in a conventional power architecture. This results in higher efficiency of the regulator sitting on the system rail and longer battery life for the portable electronic device.

One challenge with the NVDC architecture is the ability to charge an extremely discharged or shorted battery without collapsing the system rail. The system rail may not fall below seven volts or the converters on the system rail may not work properly. Additionally, the battery may be charged to six volts and need to be trickle charged. Trickle charging involves charging the battery at a much lower rate to bring a lithium ion battery out of a deep discharge state. Prior art configurations (see FIG. 1) included circuitry that initiates trickle charging when battery voltage falls below a threshold voltage of typically eight volts. When the battery voltage is low, trickle charging is initiated responsive to the drop below the threshold voltage. This causes a corresponding drop in the charging current. Since the charging current has fallen below its quick charge limit, the charger will regulate the system rail to the charging voltage typically 12.6 volt. The battery will be at its lower voltage, and a resistor 134 limits the trickle charge current.

There are three primary weaknesses with this method of charging. First, the charging current is not regulated and changes as the battery charges. The charging current is equal to 12.6V minus the voltage of the battery divided by the resistance through which the charging current is flowing. The resistance is sized so that the charging current is at the battery trickle charge spec, typically 100 milliamps, when the battery voltage is at zero volts. Since the charging current reduces as the battery charges, the charging current will fall well below the specified trickle charge current level by the time the battery has charged to approximately eight volts. In this typical case, the charging current falls to 36% of the specified trickle charge current. This low current may confuse some charging algorithms into thinking that the battery is damaged beyond repair. Additionally, this low current causes the battery charging time to be exceedingly long. A second problem arises because the maximum power dissipated by the resistance when the battery is at zero volts is 12.6 volts times 100 milliamps or 1.26 watts. This requires special thermal considerations. Finally, two PMOS switches are required to isolate the battery from the system rail when the battery is fully charged and an adaptor is present. The additional PMOS transistor switch results in more cost, higher power loss, and shorter battery life for the circuitry. Thus, an improved method for trickle charging a battery within a narrow rail architecture is desired.

SUMMARY

The present invention disclosed and claimed herein, in one aspect thereof, comprises charging circuitry for charging a battery of an electronic device using a connected AC power adaptor. The charging circuitry includes circuitry responsive to an applied regulated voltage for charging the battery connected to the charging circuitry. The circuitry prevents the regulated system voltage applied to the circuitry from falling below a settable voltage level. Additionally, the circuitry switches a charging current between a quick charge level and a trickle charge level responsive to the power dissipation in a trickle charge transistor.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
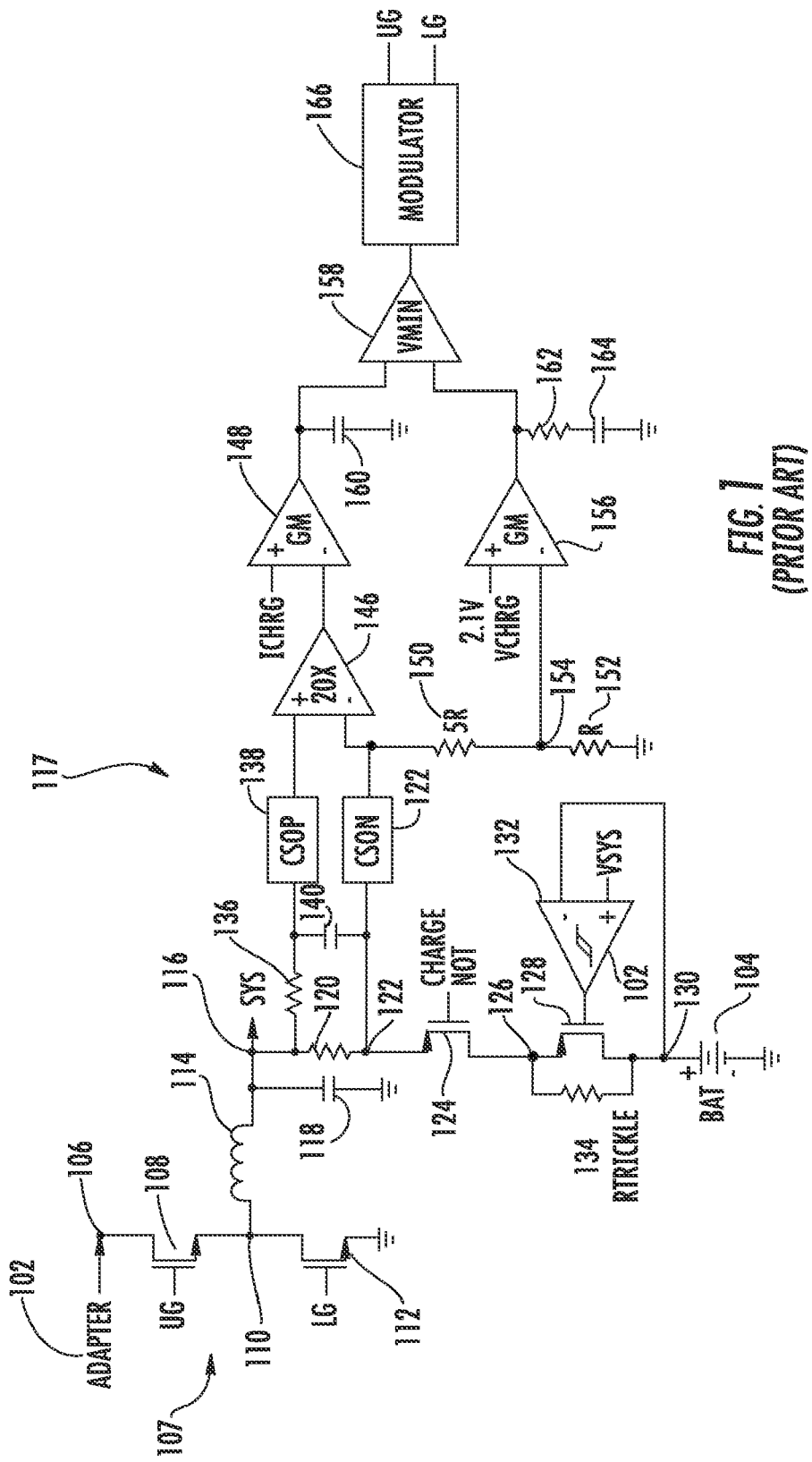
FIG. 1 is a schematic diagram of a prior art system for trickle charging a battery in a narrow rail architecture.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated a schematic diagram of a prior art system for trickle charging a battery in a narrow rail architecture. An adaptor 102 is connected to a battery 104 through associated regulator and charging circuitry. Adapter 102 connects to a node 106 that provides the rail voltage for the associated electronic device. A buck converter 107, consisting of transistors 108 and 112, inductor 114 and capacitor 118, provides a regulated system rail voltage to battery charger circuitry 117. A transistor 108 has its source/drain path connected between node 106 and node 110. A second transistor 112 is connected between node 110 and ground. An inductor 114 is connected between node 110 and node 116. Node 116 provides the system rail voltage that is used for powering the charging circuitry 117. A capacitor 118 is connected between node 116 and ground.

The charging circuitry 117 is connected to the buck converter 107 to receive the regulator rail voltage at node 116. Resistor 120 is connected between node 116 (the system rail voltage) and node 122. A first transistor 124 has its drain/source path connected between node 122 and node 126. Transistor 124 is responsive to a CHARGE NOT signal applied to the gate thereof for disconnecting the battery 104 from the power adaptor 102 when the battery is fully charged. A second transistor 128 has its drain/source path connected between node 126 and node 130. The battery 104 is connected between node 130 and ground. A comparator 132 compares the voltage at node 130 with the reference voltage (VSYS). When comparator 132 determines that the battery voltage falls below the threshold voltage VSYS, transistor 128 is turned off so that the charging current charging battery 104 passes through resistor R-trickle 134 rather than transistor 128.

A resistor 136 is connected between node 116 and node 138. A capacitor 140 is connected between node 138 (node CSOP) and node 122 (node CSON). Node CSOP 138 is connected to the positive input of a 20× amplifier 146. Node CSON 122 is connected to the negative input of the 20× amplifier 146. The output of the 20× amplifier 146 is connected to the negative input of amplifier 148. While a 20× gain and a resistor divider ratio of 5.1 are illustrated, other gains and ratios may be used. The positive input of amplifier 148 is connected to receive the reference voltage ICHRG. A voltage divider circuit is connected between the negative input of the 20× amplifier 146 and ground. The voltage divider circuit consists of a resistor 5R 150 and a resistor R 152. Resistor 150 and resistor 152 are connected at a node 154, and node 154 is connected to the negative input of a second amplifier 156. The positive input of amplifier 156 is connected to reference voltage VCHRG (the charging voltage of battery 104). The outputs of amplifiers 148 and 156 are connected to the inputs of amplifier VMIN 158. A capacitor 160 is connected between the output of amplifier 148 and ground. A series connection of resistor 162 and capacitor 164 are connected between the output of amplifier 156 and ground. The output of the amplifier VMIN 158 is connected to the input of modulator 166. The modulator 166 provides the control signals UG and LG for transistors 108 and 112.

Figure 2:
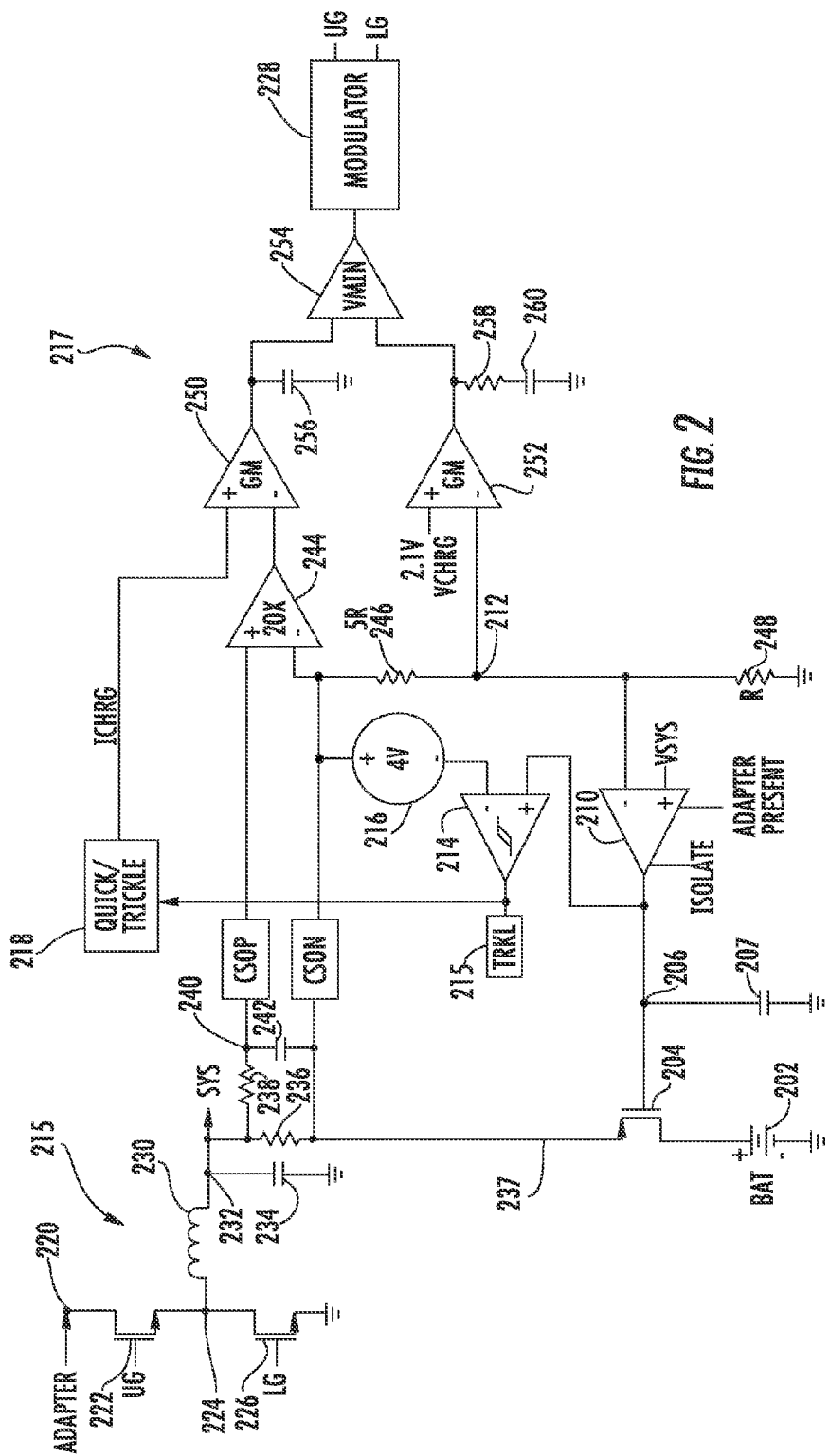
FIG. 2 is a schematic diagram of an improved system for trickle charging a battery in a narrow rail architecture.

Referring now to FIG. 2, there is illustrated the present system for overcoming the problems associated with the circuitry of FIG. 1. The battery 202 is connected to a first transistor 204 having its drain/source path connected between node 237 and the battery 202. The gate of transistor 204 is connected to node BGATE 206. An amplifier 210 comprises an output connected to node BGATE 206. Capacitor 207 connects between node 206 and ground to compensate the loop. The negative input of amplifier 210 is connected to node 212 and the positive input is connected to the system reference voltage VSYS. Amplifier 210 also has an input for the signal ISOLATE to turn off the transistor 204 when the battery 202 is fully charged. Additionally, the amplifier 210 includes an input ADAPTOR PRESENT to turn on the transistor when the adaptor is not connected to node 220. This enables the battery to provide system power.

A second comparator 214 has its output connected to node TRKL 215. The comparator 214 has its negative input connected to the lower potential terminal of a four volt voltage source 216 and its positive input connected to the output of amplifier 210 at node 206. The output of comparator 214 is connected to the reference voltage block Quick/Trickle 218. The reference voltage block Quick/Trickle 218 provides the reference voltage for the charge current GM amplifier 250. If the trickle input to Quick/Trickle 218 for comparator 214 is low, the output of the Quick/Trickle is the reference voltage for providing quick charge level. If the Trickle input is high, the output is the reference voltage for providing trickle charge level. The Quick/Trickle acts as a multiplexer between the two levels.

An adaptor is connected to the buck converter 215 at node 220. The buck converter 215 includes transistors 222 and 226, inductor 230 and capacitor 234. An upper transistor 222 has its source/drain path connected between node 220 and node 224. A lower gate transistor 226 has its source/drain path connected between node 224 and ground. The transistors 222 and 226 receive input control signals at their gates from modulator 228. Also connected to node 224 is an inductor 230 having a first side connected to node 224 and a second side connected to the system rail voltage node 232. A capacitor 234 is connected between node 232 and ground.

The buck converter 215 provides a regulated voltage to the battery charger circuitry 217. A resistor 236 is connected between node 232 and node 237. A resistor 238 is connected between node 232 and node 240. Node 237 comprises node CSON. Node CSOP 240 is connected to a positive input of a 20× amplifier 244. Node CSON 237 is connected to the negative input of the 20× amplifier 244. A voltage divider consisting of resistance 5R 246 and resistance R 248 is connected between node CSON 237 and the negative input of the 20× amplifier 244 and ground. The resistors 246 and 248 are connected at node 212 which is connected to the negative input of the amplifier 210 and to the negative input of amplifier 252. The positive input of amplifier 252 is connected to 2.1 reference voltage VCHRG. The output of 20× amplifier 244 is connected to the negative input of GM amplifier 250. The positive input of amplifier 250 is connected to the output of Quick/Trickle 218. The outputs of amplifier 250 and amplifier 252 are connected to the inputs of amplifier VMIN 254. Connected to the output of amplifier 250 is a capacitor 256 which is connected between the output and ground. A series connection of a resistor 258 and a capacitor 260 are connected between the output of amplifier 252 and ground. The output of amplifier VMIN 254 is connected to the input of modulator 228 providing the UG and LG control signals to transistors 222 and 226, respectively.

The narrow rail architecture circuit illustrated in FIG. 2 includes a control loop that limits the system rail voltage at node 232 from falling below a settable level of typically eight volts. When the battery voltage falls below eight volts, the amplifier 210 driving the gate of the PMOS transistor 204 drives the transistor in a source follower configuration to regulate the system rail voltage at node 232 to eight volts. Comparator 210 also includes a backup comparator that will quickly turn off transistor 204 in the event that the analog loop does not respond quickly enough, and when the system rail voltage at node 232 drops below the set point of eight volts. The new control loop including amplifier 210 is independent from the switching regulator circuitry consisting of transistors 222, 226, inductor 230 and capacitor 234 and does not directly affect the PWM duty cycle.

The amplifier 210 has an ISOLATE input to turn off the transistor 204 once the battery becomes fully charged and an ADAPTOR PRESENT input to turn on the transistor 204 when the adaptor is not present. The ADAPTOR PRESENT input takes priority over the isolate input. The ISOLATE input takes priority over the Quick/Trickle block 218 output. Comparator 214 compares the voltage at the output of amplifier 210 to node 237 minus 4V to determine if transistor 204 is operating within a linear region of operation or a saturated region of operation. If it is in the linear region of operation, the charge current can be temporarily reduced to the trickle charge level by applying a high output to the reference voltage block Quick/Trickle 218, and the host device can be notified of this operation region. If the transistor is not in the linear region of operation, a low output is applied to the reference voltage Quick/Trickle block 218 to cause the charge current to be provided at the quick charge level. Alternatively, the comparator 214 can examine the voltage at node 237 to determine the drain to source voltage VDS and whether it is greater than a threshold voltage of approximately 200 millivolts. If VDS is greater than the threshold, the charge current can be reduced by applying a high output to the reference voltage block Quick/Trickle 218.

Figure 3A:
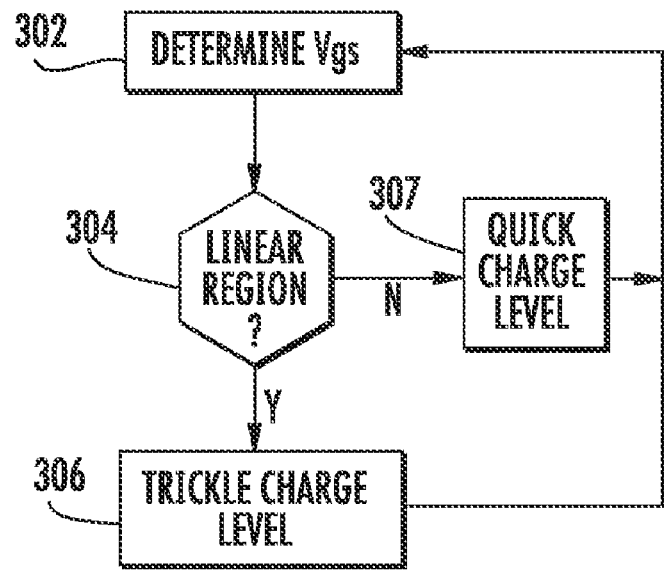
FIGS. 3a and 3b illustrate alternative methods for determining what the state of operation of the trickle charging transistor of FIG. 2.

The process of monitoring the voltages in the transistor enable the level of the charge current to be based on the power dissipation in transistor 204. These operations are more fully illustrated in FIGS. 3a and 3b. FIG. 3a illustrates the first mode of operation wherein the gate to source voltage of transistor 204 is determined. Initially, at step 302, a determination is made of the gate to source voltage of transistor 204. If the gate to source voltage indicates that the transistor 204 is operating within a linear region, as determined at inquiry step 304, the charge current is set to the trickle charge level at step 306. If the transistor is not operating within the linear region the charge current is set to the quick charge level at step 307. Control passes back to step 302 to continue monitoring the gate to source voltage.

Figure 3B:
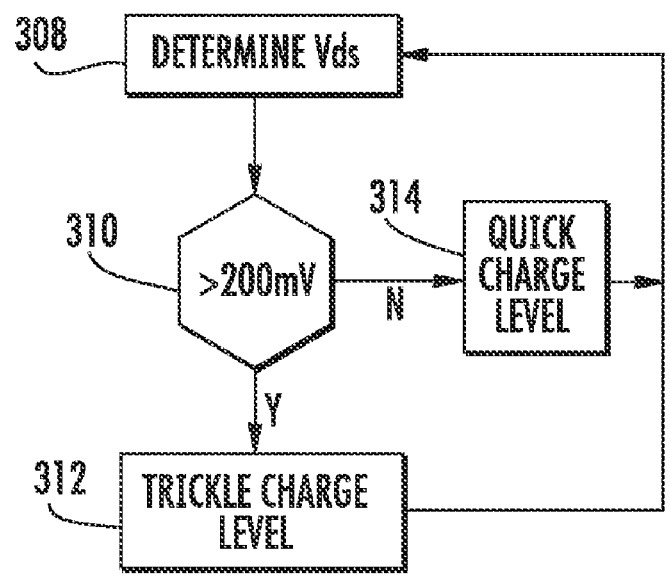

Referring now also to FIG. 3b, there is illustrated an alternative embodiment wherein the drain to source voltage is determined at step 308. Inquiry step 310 determines if the drain to source voltage is greater than a threshold voltage of 200 millivolts. If so, the charge current is set to the trickle charge level at step 312. If not, the charge current is set to the quick charge level at step 314. Control passes back to step 308 to continue to monitor the drain to source voltage 308.

Figure 4:
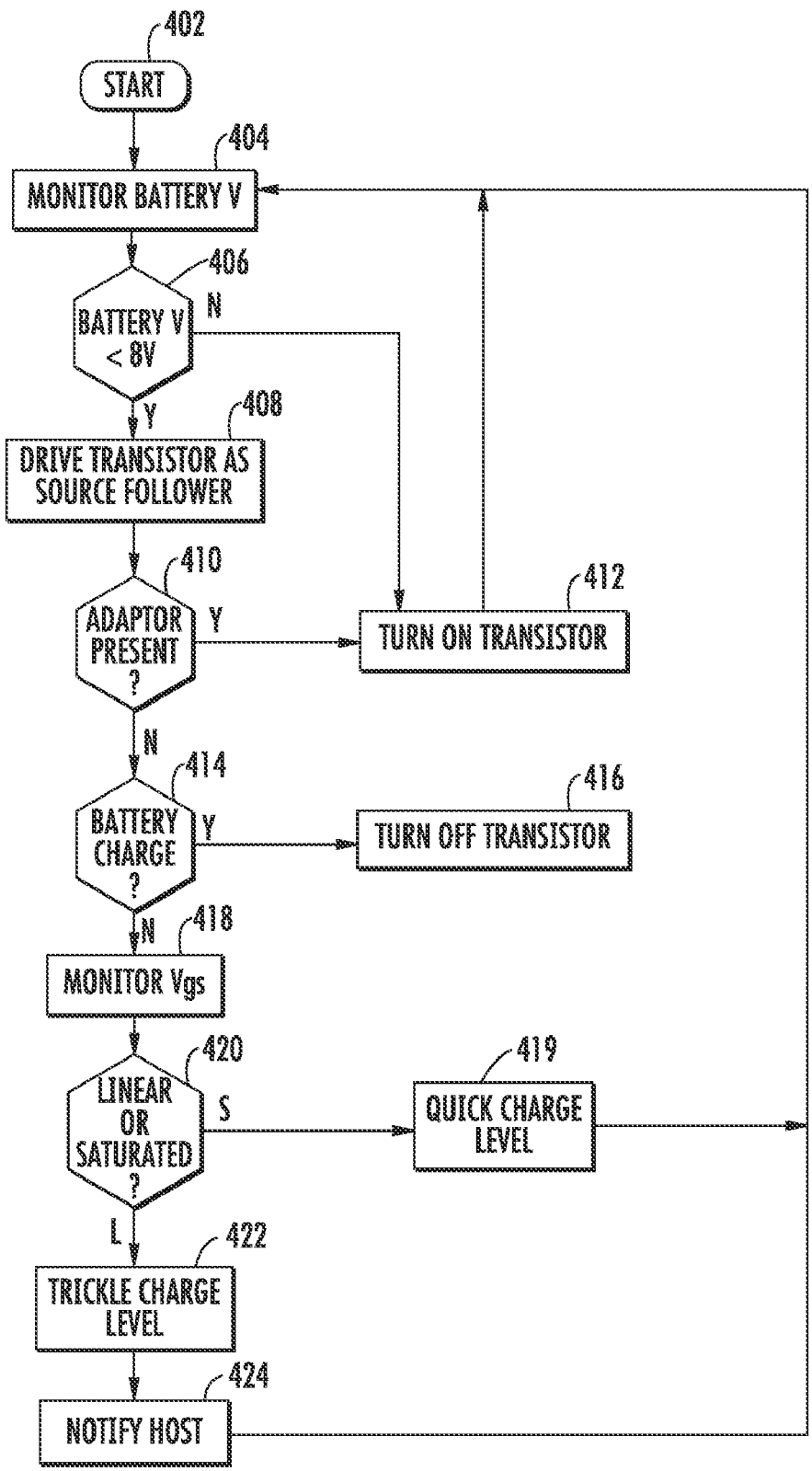
FIG. 4 is a flow diagram illustrating the method for trickle charging a battery using the circuitry of FIG. 2.

Referring now to FIG. 4, there is illustrated the overall operation of the circuit described with respect to FIG. 2. The process begins at step 402, and the battery voltage is monitored at step 404. Inquire step 406 determines if the battery voltage is less than approximately eight volts. If so, the transistor 204 is driven as a source follower circuit by the control loop including amplifier 210 at step 408. Otherwise, the transistor 204 is turned on at step 412. Inquiry step 410 determines if the ADAPTOR PRESENT input being applied to the amplifier 210 is low. If so, the transistor 204 is turned on at step 412. If not, inquiry step 414 determines if the battery 202 has been completely charged. If so, the transistor is turned off at step 416. If the battery has not yet been completely charged, the gate to source voltage is monitored at step 418. Inquiry step 420 determines from the monitor gate to source voltage if the transistor 204 is operating in a linear or saturated region of operation. If operating in the saturated region, the charge current is set to quick charge level at step 419 and control passes back to step 404. If inquiry step 420 determines that the transistor is operating in the linear mode of operation, the charge current is set to trickle levels at step 422, and the host is notified of this condition at step 424. Control then returns back to step 404.

The configuration described with respect to FIG. 2 addresses the weaknesses of the prior art mentioned previously. First, the charging current is no longer a function of the battery voltage, but is regulated to the charge current ICHRG by the current loop. The power dissipation within the transistor 204 is now eight volts times 100 milliamps or 0.8 watts instead of 1.26 watts. The power dissipation savings is even more dramatic with a four cell 16.8 volt lithium ion battery. Finally, only a single PMOS transistor 204 is required for the configuration rather than the dual transistor configuration described with respect to FIG. 1.

It will be appreciated by those skilled in the art having the benefit of this disclosure that this invention provides an improved trickle charging circuitry. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An apparatus for charging a battery of an electronic device using a connected a/c power adapter, comprising:

a voltage regulator for regulating an input voltage provided by the a/c power adapter and providing a regulated output voltage;

a transistor connected between the regulated output voltage and the battery;

charging control circuitry responsive to the regulated output voltage applied thereto for controlling charging of the battery connected to the charging control circuitry;

wherein the charging control circuitry prevents the regulated voltage applied to the charging control circuitry from falling below a settable voltage level and switches a charging current between a quick charge level and a trickle charge level responsive to the state of the transistor;

wherein the charging control circuitry further drives the transistor in a source follower configuration to maintain the regulated output voltage at the settable voltage level if a battery voltage is approximately less than the settable voltage level.

2. The apparatus of claim 1, wherein the charging control circuitry further includes:

an amplifier connected to drive the transistor; and wherein the amplifier drives the transistor in a source follower configuration to maintain the regulated output voltage at the settable voltage level if the battery voltage is approximately less than the settable voltage level.

3. The apparatus of claim 2, wherein the amplifier turns off the transistor to disconnect the battery from the charging control circuitry responsive to a first control input indicating the battery is fully charged.

4. The apparatus of claim 2, wherein the amplifier turns on the transistor to connect the battery to the charging control circuitry responsive to a second control input indicating the a/c adapter has been disconnected from the voltage regulator.

5. The apparatus of claim 2, wherein the charging control circuitry further includes:
a second comparator for generating a first output if the transistor is operating in a linear region of operation and for generating a second output if the transistor is not operating in a linear region of operation;
a reference voltage block for generating a reference voltage at a first level responsive to the first output and for generating the reference voltage at a second level responsive to the second output; and
wherein the reference voltage at the first level causes the charging circuitry to provide a charging current at the trickle charge level and the reference voltage at the second level causes the charging circuitry to provide a changing current at the quick charge level.

6. The apparatus of claim 2, wherein the charging control circuitry further includes:
a second comparator for generating a first output if a drain to source voltage of the transistor is greater than a predetermined voltage level and for generating a second output if the drain to source voltage of the transistor is not greater than the predetermined voltage level;
a reference voltage block for generating a reference voltage at a first level responsive to the first output and for generating the reference voltage at a second level responsive to the second output; and
wherein the reference voltage at the first level causes the charging control circuitry to provide a charging current at the trickle charge level and the reference voltage at the second level causes the charging circuitry to provide a changing current at the quick charge level.

7. The apparatus of claim 2, wherein a power dissipation within the transistor is less than 1 watt.

8. The apparatus of claim 2, wherein the charging control circuitry further includes a back-up comparator for turning off the transistor if the amplifier does not respond quickly enough and when the regulated voltage applied to the charging circuitry drops below the settable voltage level.

9. An apparatus for charging a battery of an electronic device using a connected a/c power adapter, comprising:
a voltage regulator for regulating an input voltage provided by the a/c power adapter and providing a regulated output voltage;
charging control circuitry responsive to the regulated output voltage applied thereto for controlling charging of the battery connected to the charging circuitry, the charging circuitry including:
a transistor connected between the regulated output voltage and the battery;
an amplifier connected to drive the transistor;
a comparator for generating a first output if the transistor is operating in a linear region of operation and for generating a second output if the transistor is not operating in a linear region of operation;
a reference voltage block for generating a reference voltage at a first level responsive to the first output and for generating the reference voltage at a second level responsive to the second output;
wherein the amplifier drives the transistor in a source follower configuration to maintain the regulated output voltage at the settable voltage level if the battery voltage is approximately less than the settable voltage level; and
wherein the reference voltage at the first level causes the charging control circuitry to provide a charging current at a trickle charge level and the reference voltage at the second level causes the charging circuitry to provide a changing current at a quick charge level.

10. The apparatus of claim 9, wherein the amplifier turns off the transistor to disconnect the battery from the charging control circuitry responsive to a first control input indicating the battery is fully charged.

11. The apparatus of claim 9, wherein the amplifier turns on the transistor to connect the battery to the charging control circuitry responsive to a second control input indicating the a/c adapter has been disconnected from the voltage regulator.

12. The apparatus of claim 9, wherein a power dissipation within the transistor is less than 1 watt.

13. The apparatus of claim 9, wherein the charging control circuitry further includes a back-up comparator for turning off the transistor if the amplifier does not respond quickly enough and when the regulated voltage applied to the charging circuitry drops below the settable voltage level.

14. Charging circuitry for charging a battery of an electronic device using a connected a/c power adapter, comprising:
a transistor connected between an applied regulator voltage and the battery;
circuitry responsive to the applied regulated voltage for charging the battery connected to the charging circuitry;
wherein the circuitry prevents the regulated voltage applied to the circuitry from falling below a settable voltage level and switches a charging current between a quick charge level and a trickle charge level responsive to a state of the transistor; and
wherein the control circuitry further drives the transistor in a source follower configuration to maintain the regulated output voltage at the settable voltage level if a battery voltage is approximately less than the settable voltage level.

15. The charging circuitry of claim 14, wherein the circuitry further includes:
an amplifier connected to drive the transistor; and
wherein the amplifier drives the transistor in a source follower configuration to maintain the regulated output voltage at the settable voltage level if the battery voltage is approximately less than the settable voltage level.

16. The charging circuitry of claim 15, wherein the amplifier turns off the transistor to disconnect the battery from the circuitry responsive to a first control input indicating the battery is fully charged.

17. The charging circuitry of claim 15, wherein the amplifier turns on the transistor to connect the battery to the circuitry responsive to a second control input indicating the a/c adapter has been disconnected from the voltage regulator.

18. The charging circuitry of claim 15, wherein the circuitry further includes:
a comparator for generating a first output if the transistor is operating in a linear region of operation and for generating a second output if the transistor is not operating in a linear region of operation;
a reference voltage block for generating a reference voltage at a first level responsive to the first output and for generating the reference voltage at a second level responsive to the second output; and
wherein the reference voltage at the first level causes the circuitry to provide a charging current at the trickle charge level and the reference voltage at the second level causes the circuitry to provide a changing current at the quick charge level.

19. The charging circuitry of claim 15, wherein the circuitry further includes:

a comparator for generating a first output if a drain to source voltage of the transistor is greater than a predetermined voltage level and for generating a second output if the drain to source voltage of the transistor is not greater than the predetermined voltage level;

a reference voltage block for generating a reference voltage at a first level responsive to the first output and for generating the reference voltage at a second level responsive to the second output; and wherein the reference voltage at the first level causes the circuitry to provide a charging current at the trickle charge level and the reference voltage at the second level causes the charging control circuitry to provide a changing current at the quick charge level.

20. The charging circuitry of claim 15, wherein the circuitry further includes a back-up comparator for turning off the transistor if the amplifier does not respond quickly enough and when the regulated voltage applied to the charging circuitry drops below the settable voltage level.

21. The charging circuitry of claim 15, wherein the circuitry further includes:

a comparator for generating a first output if a drain to source voltage of the transistor is greater than a predetermined voltage level and for generating a second output if the drain to source voltage of the transistor is not greater than the predetermined voltage level;

a reference voltage block for generating a reference voltage at a first level responsive to the first output and for generating the reference voltage at a second level responsive to the second output; and wherein the reference voltage at the first level causes the circuitry to provide a charging current at the trickle charge level and the reference voltage at the second level causes the circuitry to provide a changing current at the quick charge level.

22. A method for charging a battery of an electronic device using a connected a/c power adapter, comprising the steps of:

regulating an input voltage provided by the a/c power adapter;

providing a regulated output voltage;

controlling charging of the battery responsive to the regulated output voltage, the step of controlling further comprising the steps of:

monitoring a state of a transistor connected between the regulated output voltage and the battery preventing the regulated voltage from falling below a settable voltage level and switching a charging current between a quick charge level and a trickle charge level responsive to the state of the transistor; and driving the transistor in a source follower configuration to maintain the regulated output voltage at the settable voltage level if the battery voltage is approximately less than the settable voltage level.

23. The method of claim 22, wherein the step of controlling further comprises the steps of turning off the transistor to disconnect the battery responsive to a first control input indicating the battery is fully charged.

24. The method of claim 22, wherein the step of controlling further comprises the step of turning on the transistor to connect the battery responsive to a second control input indicating the a/c adapter has been disconnected.

25. The apparatus of claim 22, wherein the step of controlling further includes the steps of:

generating a first output if the transistor is operating in a linear region of operation;

generating a second output if the transistor is not operating in a linear region of operation;

generating a reference voltage at a first level responsive to the first output;

generating the reference voltage at a second level responsive to the second output; and providing a charging current at the trickle charge level responsive to the reference voltage at the first level;

providing the changing current at the quick charge level responsive to the reference voltage at the second level.

26. The method of claim 22, wherein the step of controlling further includes the steps of:

generating a first output if a drain to source voltage of the transistor is greater than a predetermined voltage level;

generating a second output if the drain to source voltage of the transistor is not greater than the predetermined voltage level;

generating a reference voltage at a first level responsive to the first output;

generating the reference voltage at a second level responsive to the second output;

providing a charging current at the trickle charge level responsive to the reference voltage at the first level; and providing the changing current at the quick charge level responsive to the reference voltage at the second level.

27. The method of claim 22, wherein the step of controlling further includes the step of turning off the transistor responsive to a response time of an amplifier driving the transistor and the regulated voltage dropping below the settable voltage level.

* * * * *